United States Patent [19]

Shimizu

[11] Patent Number: 4,644,824
[45] Date of Patent: Feb. 24, 1987

[54] EPICYCLIC GEAR SPEED CHANGE MECHANISM

[75] Inventor: Yasuo Shimizu, Tochigi, Japan

[73] Assignee: Honda Giken Kogyo Kabushiki Kaisha, Tokyo, Japan

[21] Appl. No.: 713,801

[22] Filed: Mar. 19, 1985

[30] Foreign Application Priority Data

Mar. 24, 1984 [JP] Japan .................................. 59-56460

[51] Int. Cl.⁴ .......................... F16H 3/44; F16H 57/00
[52] U.S. Cl. ..................................... 74/781 R; 74/410
[58] Field of Search ................. 74/781 R, 781 B, 410; 464/102, 104; 403/380, 354

[56] References Cited

U.S. PATENT DOCUMENTS 3,108,494 10/1963 Kell .............................. 74/781 R X

FOREIGN PATENT DOCUMENTS

| 1110021 | 6/1961 | Fed. Rep. of Germany .... 74/781 R |
| 2353961 | 5/1975 | Fed. Rep. of Germany ....... 464/104 |
| 2801812 | 7/1979 | Fed. Rep. of Germany .... 74/781 R |
| 0050255 | 3/1984 | Japan ............................... 74/781 R |
| 307667 | 3/1929 | United Kingdom .................. 74/410 |

Primary Examiner—Leslie A. Braun
Assistant Examiner—Dirk Wright
Attorney, Agent, or Firm—Lyon & Lyon

[57] ABSTRACT

A drive pulley mechanism for an engine for driving auxiliary equipment by V-belts at two different speed ratios relative to engine speed wherein an epicyclic gear train of a ring gear, multiple planet gears and a sun gear is employed for the low speed-change drive as established by a centrifugal clutch functioning at engine speeds above a predetermined level to release the direct one-to-one drive. An Oldham coupling connects the sun gear to the input drive member for causing a uniform distribution of driving loads through the multiple planet gears to the ring gear.

7 Claims, 4 Drawing Figures

EPICYCLIC GEAR SPEED CHANGE MECHANISM

This invention relates to a speed change gear mechanism using an epicyclic gear train in a pulley drive for selective two-speed operation.

Auxiliary equipment on an engine such as, for example, an alternator, a compressor for use in an air conditioning system, a power steering pump and the like are driven generally by a V-belt from a pulley on the end portion of the engine crankshaft, and therefore the auxiliary equipment is driven at a rotational speed proportional to the running speed of the engine.

However, most of the auxiliary equipment does not require a rotational speed above a predetermined magnitude and therefore in the high-speed operation of the engine it is desirable that the excessive rotation of the auxiliary equipment be avoided by a speed change gear to save on fuel consumption of the engine, enhance the durability of the auxiliary equipment, decrease noises, and further to allow the auxiliary equipment to be smaller and lighter.

It has previously been proposed that such a speed change gear should employ an epicyclic gear train which has the superior features of a large torque transfer capacity from a plurality of intermediate gears engaging simultaneously, compact and space efficient by using an internal gear, and that various inputs and outputs can be achieved by the selection of any arbitrary transmission ratio. The epicyclic gear train is generally comprised of a ring gear having internal teeth, a plurality of planet gears positioned internally and engaging the ring gear, a carrier rotatably supporting the planet gears and also rotatable itself, and a sun gear having external teeth and engaging the planet gears. Accordingly, a load imposed on the ring gear, the planet gears, the bearings for the planet gears and the sun gear will be divided and carried by the plural planet gears since the planet gears are positioned between the ring gear and the sun gear and are in engagement with both the ring gear and the sun gear. Thus, the input torque imposed on the epicyclic gear train is dispersed uniformly to the plurality of planet gears and transferred to an output member, whereby the advantages of the epicyclic gear train can be utilized fully and the size and weight minimized. However, heretofore to accomplish these advantages it has been necessary to use precision formed gears, gear teeth and other components whereby the cost of production and assembly is excessive and unavoidable.

It is an object of this invention to provide a construction of the mechanism wherein the input torque imposed on the epicyclic gear train can be dispersed uniformly to the plurality of planet gears even without precisely shaped and dimensioned gears, gear teeth and the other components.

To attain the above object, in a speed change gear wherein an epicyclic gear train is interposed between an input side rotary member and an output side rotary member and which is either direct-coupled for no speed change or coupled through the epicyclic gear train for a speed change that is controlled according to the rotational speed of the input side rotary member, thereby transferring power from the input side rotary member to the output side rotary member, the invention is characterized in that the sun gear of the epicyclic gear train is supported on a fixed shaft through a so-called Oldham's coupling or similar device.

A preferred embodiment of this invention is shown in the accompanying drawings wherein.

Figure 1:
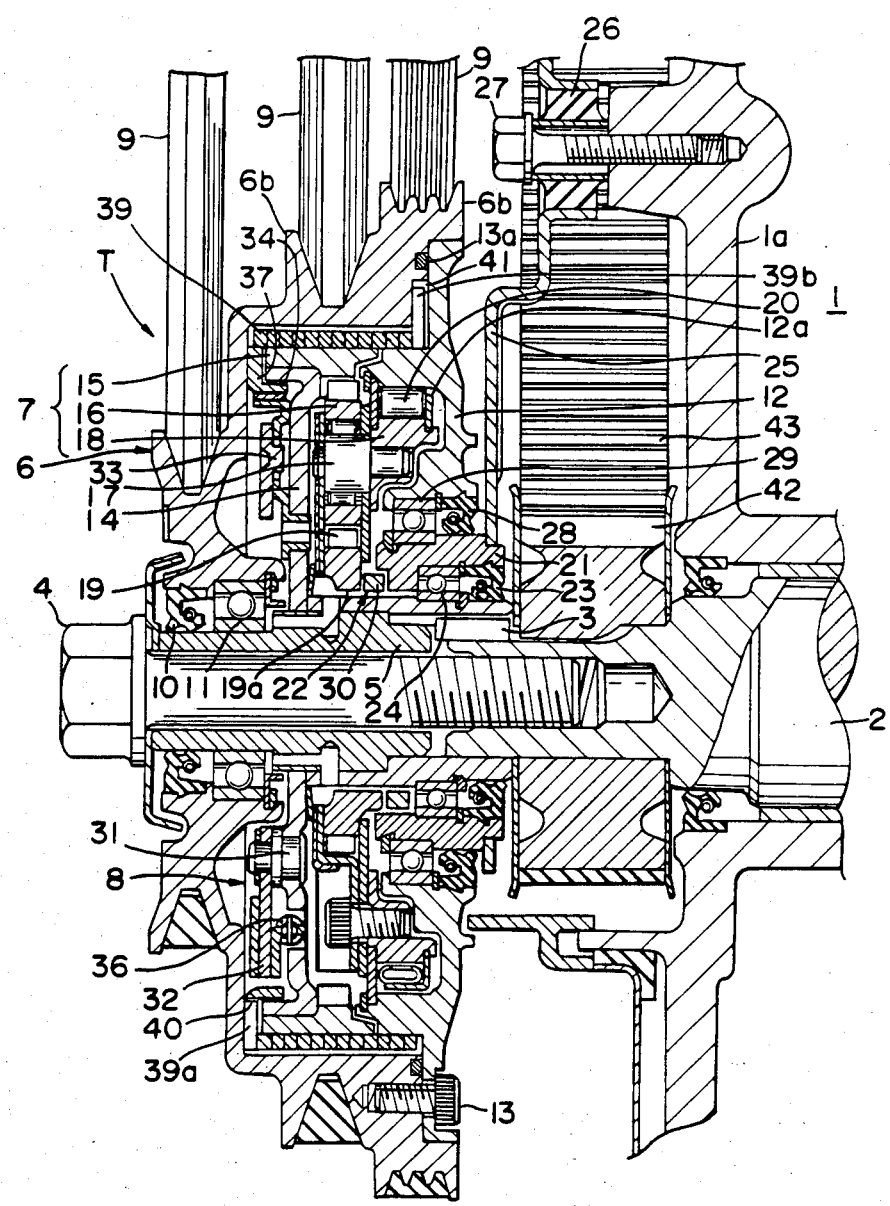
FIG. 1 is a sectional elevation view than along the longitudinal, central axis of the mechanism of this invention.

Referring now in detail to the drawings embodying the invention, FIG. 1 shows a longitudinal section of the speed change gear T according to this invention, and the speed change gear T includes a driving shaft (input side rotary member) 5 on the input side which is fixed on the end portion of the crankshaft 2 of the engine 1 with a bolt 4 and a key 3, a pulley case (output side rotary member) 6 on output side, an epicyclic gear train 7, and a centrifugal clutch 8 interposed between the pulley case 6 and the driving shaft 5.

The pulley case 6 includes a plurality of pulleys 6b on a bowl-like body with an auxiliary equipment driving belt 9 wound on each pulley. The front boss of the pulley case 6 is supported on a nose portion of the driving shaft 5 in rotatable and fluid-tight relationship through a bearing 11 and an oil seal 10. The epicyclic gear 7 is enclosed in the body of pulley case 6. An annular rear cover 12 is fixed on the open end of the pulley case 6 at the engine 1 side of the pulley case by bolts 13 and sealed by an O-ring 13a.

Figure 2:
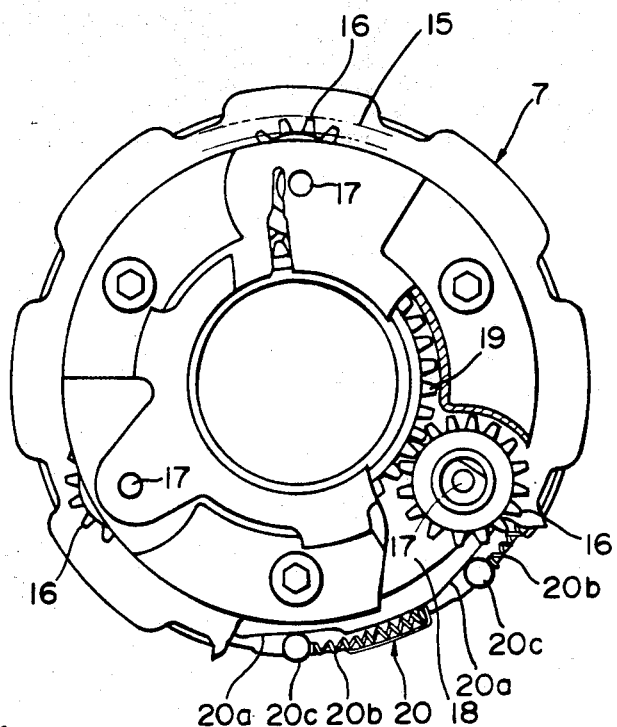
FIG. 2 is an end view of the speed change gearing with portions broken away.

As shown in FIG. 2, the epicyclic gear train 7 comprises a ring gear 15 consisting of an internal gear provided on the perimeter of a flange 14 fixed on the driving shaft 5, a plurality (three are shown for example) of planet gears 16 engaging the ring gear 15, a carrier 18 supporting each of the planet gears 16 rotatably through a bearing shaft 17 and rotatable itself, and a central non-rotating sun gear 19 engaging the plurality of planet gears 16.

The carrier 18 is fitted in an annular concavity 12a in the rear cover 12 through a one-way clutch 20. The center hole 19a of the sun gear 19 is fitted loosely on the outer surface of the driving shaft 5. An end portion of the sun gear 19 on the engine 1 side is coupled to the end portion of a fixed shaft 21 opposite thereto through an Oldham's coupling 22. The fixed shaft 21 is hollow, short and cylindrical and is supported on the outer surface of the driving shaft 5 through an oil seal 23 and a bearing 24. The fixed shaft 21 is fixed on one end of a bracket 25 and the other end of the bracket 25 is supported on the case 1a of the engine 1 by a bolt 27 through a buffer 26 of rubber or the like. Further, a central hole in the rear cover 12 is supported on the outer surface of the fixed shaft 21 through an oil seal 28 and a bearing 29.

Figure 3:
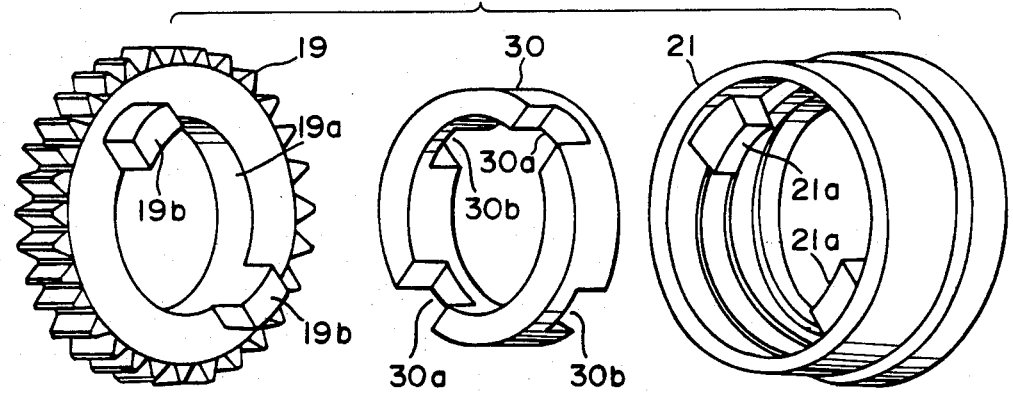
FIG. 3 is an exploded, perspective view of the one-way clutch mechanism.

As shown in FIG. 3, the Oldham's coupling 22 is constituted of a pair of square pawls 19b, 19b provided on the engine 1 side end surface of the sun gear 19 at the edge portion of the center hole 19a and project axially in the same direction and also radially opposite each other, a pair of square pawls 21a, 21a provided on an inner surface of the fixed shaft 21 to project toward the center and also radially opposite each other, and an intermediate ring 30 fitting in an inner perimeter of the fixed shaft 21 with proper clearance left therebetween and having square grooves 30a, 30a and 30b, 30b engaging with the square pawls 19b, 19b and 21a, 21a respectively, suitable clearances are provided between the outer surface of the intermediate ring 30 and the inner surface of the fixed shaft 21, between the inner surface of the sun gear 19 and the outer surface of the driving shaft 5. Thus, the sun gear 19 is allowed to move relative to the fixed shaft 21 as displaced freely in the clearance gaps but relative rotation of the two is prevented.

Figure 4:
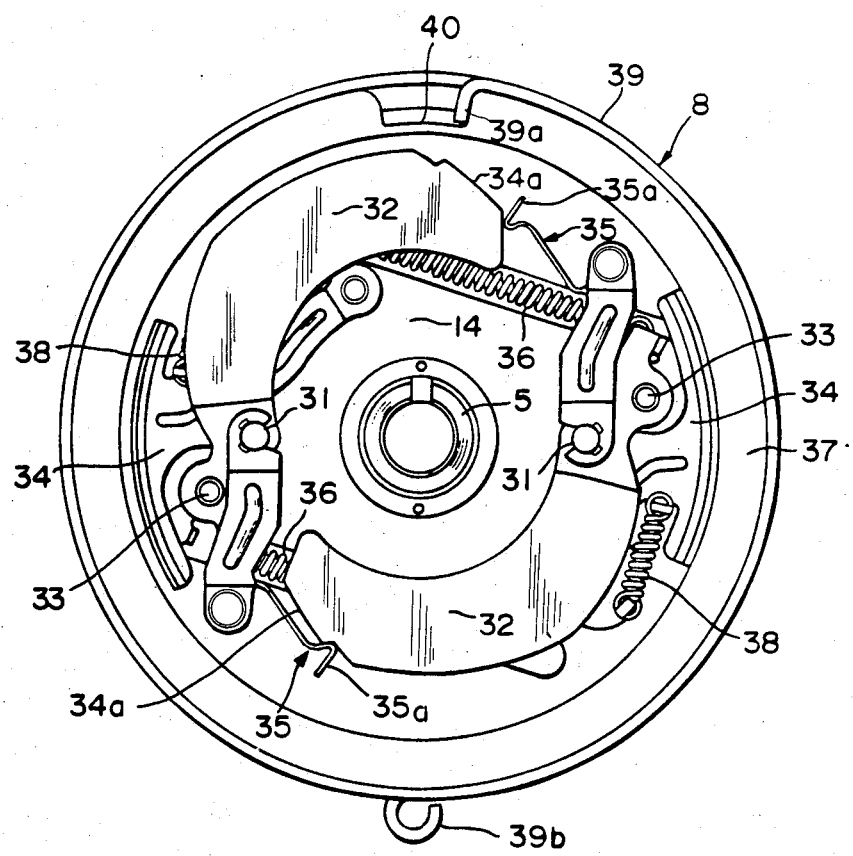
FIG. 4 is an end view of the centrifugal clutch portion of the mechanism of this invention.

As shown in FIG. 4, the centrifugal clutch 8 is comprised of two identical halves with each half having a centrifugal weight 32 supported rotatably on a bearing shaft 31 projected on the flange 14 of the driving shaft 5, a friction shoe 34 disposed between the centrifugal weight 32 and the flange 14 of the driving shaft 5 and having its one end fitted in the flange 14 and the other end fitted with an engaging pin 33 projected near the bearing shaft 31 of the centrifugal weight 32 with a suitable gap left therewith, a cam face 34a formed on a free end of the centrifugal weight 32, a detent mechanism 35 consisting of a detent spring 35a engaging with the cam face 34a, a weight spring 36 for urging the centrifugal weight 32 in the inward direction against the centrifugal force on its mass, a friction drum 37 fitted in an annular portion 14a projected on the outer perimeter of the flange 14 of the driving shaft 5, and a shoe spring 38 for urging the friction shoe 34 in the direction of the friction drum 37.

As shown in FIG. 2, the one-way clutch 20 includes a multitude of inclined grooves 20a having an ascending taper in one direction on the outer perimeter of the carrier 18, and engaging a roller 20c pressed by a spring 20b in an ascending direction of the taper in each groove 20a. Accordingly, when a relative rotating motion of the rear cover 12 on output side and the carrier 18 works in the ascending direction of the taper through the roller 20c, the rear cover 12 and the carrier 18 are joined and locked together by the wedge action, and when it works in a descending direction of the taper, the rear cover 12 and the carrier 18 are detached and free to rotate relative to one another.

A lap spring 39 is interposed between the pulley case 6 and the friction drum 37. As shown in FIGS. 1 and 4, the lap spring 39 is a multiplex-wound coil spring almost rectangular in section with an input side hook 39a bent in the direction of the rotation axis on its one end and an output side hook 39b bent annularly on the other end, the input side hook 39a is engaged with an opening 40 formed in the outer perimeter of the friction drum 37, and the output side hook 39b is engaged with an opening 41 formed in an end surface on the engine 1 side of the pulley case 6. The lap spring 39 is enclosed between an outer surface portion of the ring gear 15 and an inner surface portion of the pulley case 6 with a suitable gap left therefor. The tightening direction of the lap spring 39 coincides with a rotating direction of the driving shaft 5.

A timing belt 43 is wound on a pulley 42 mounted on the crankshaft 2 of the engine 1.

The operation of the speed change gear T of the invention is as follows. When the crankshaft 2 of the engine 1 rotates at a predetermined value or below, the centrifugal force on the centrifugal weights 32 of the centrifugal clutch 8 is smaller than the force of the weight springs 36 and the detent mechanisms 35, whereby the friction shoe 34 is pressed against the friction drum 37, and the centrifugal clutch 8 is engaged and connected. Accordingly, the turning force of the driving shaft 5 is in the direction for tightening the lap spring 39 through the friction drum 37, the lap spring 39 tightens on both the outer surface of the ring gear 15 and the outer surface of the rear cover 12 whereby the ring gear 15 and the rear cover 12 are bound tightly by a force greater than a binding force of the centrifugal clutch 8 by the wrapping effect of the lap spring 39. Thus, the rotation of the input side driving shaft 5 is transferred directly to the output side rear cover 12 through the centrifugal clutch 8 and the lap spring 39, and a direct-coupled transmission system of one-to-one rotational ratio between the input side and the output side is constituted. In this case, each of the planet gears 16 rotates on its axis and revolves in the same direction as the ring gear 15 around the sun gear 19 according to the rotation of the ring gear 15, and the revolving motion results in a reduced rate of rotation of the carrier 18. Since the rotation of the carrier 18 thus decelerated is slower than the rotation of the driving shaft and than the rear cover 12 coupled thereto, the difference in rotation is accommodated by the idling of the one-way clutch 20.

Next, when the rotational speed of the crankshaft 2 of the engine 1 exceeds a predetermined value and thus the centrifugal force on the centrifugal weights 32 exceeds a predetermined value, the centrifugal weights 32 are released from the detent mechanism 35 to expand instantaneously against the spring force of the weight spring 36, whereupon the engaging pin 33 engages with the friction shoe 34, and thus the friction shoe 34 is released from the friction drum 37. The friction drum 37 and the driving shaft 5 are disconnected from each other and therefore the lap spring 39 loosens as a result of its own strength and the centrifugal force on the spring, whereby the ring gear 15 and the rear cover 12 are disconnected from each other. Each planet gear 16 rotates on its axis and revolves in the same direction as the ring gear 15 around the sun gear 19 in accordance with the rotation of the ring gear 15 rotating together with the driving shaft 5. The revolving motion results in decelerating the carrier 18 in rotation, and the rotation of the carrier 18 is transferred to the pulley case 6 through the rear cover 12 by engagement of the one-way clutch 20. Thus, a reduction transmission system for reducing the speed of the pulley case 6 in rotation on the basis of the intrinsic reduction gear ratio of the epicyclic gear train 7 relative to the rotation of the crankshaft 2 of the engine 1 is constituted.

In this last example, when the speed change gear T constitutes the reduction transmission system, the one-way clutch 20 couples the carrier 18 and the rear cover 12, and essentially the carrier 18 is coupled solidly to the rear cover 12. The rotational center of the rear cover 12 tends to be displaced in the direction of the tension imposed by the belt 9 from the rotational center of the ring gear 15 due to the inherent clearance in the bearings 11, 24, 29. Also the input torque from the ring gear 15 is not dispersed uniformly to the plurality of the planet gears 16 unless the tooth form is very precise and the center line dimensions are exact. Therefore, it normally would be expected with mass production components that some of the planet gears 16 will be idling and as a consequence the direction of the load on the sun gear 19 is not balanced, whereby a thrust is generated in the direction of idling planet gears 16.

However, in this invention, since the sun gear 19 is supported on the fixed shaft 21 through the Oldham's coupling 22, only relative rotation is prevented whereby the sun gear 19 moves in the thrust direction to make the idling planet gears 16 share the load. Thus, the input torque from the ring gear 15 is imposed uniformly on the planet gears 16, the load imposed on each of the gears 15, 16, and 19 is adjusted to one per the number of the planet gears 16 disposed, and thus the load transfer ability of the epicyclic gear 7 can be fully utilized. Accordingly, the load imposed on the gears 15, 16 and 19 of the epicyclic gear 7 and the shaft 17 bearing the planet gears 16 is minimized, the durability is enhanced, and smaller and lighter structures can be used.

Although the above embodiment is described as applied to the type of device wherein the control of the transfer by tightening or loosening of the lap spring 39 is effected by the centrifugal clutch, the invention can also be applied to a device in which the control of the transfer by tightening or loosening of the lap spring 39 may be by an electromagnetic clutch or otherwise, and it is to be understood that various modifications may be made for other constructions without departing from the spirit of the invention.

I claim:

1. In a speed change pulley drive mechanism employing an epicyclic gear train with a ring gear, multiple planet gears and a sun gear, input and output members, and a clutch operable to either directly connect the input and output rotary members or indirectly connect the input and output members through the epicyclic gear train, the improvement comprising, means supporting the sun gear for preventing rotational movement while permitting only limited radial movement and for relatively uniformly engaging said multiple planet gears.

2. The mechanism of claim 1 wherein said means comprises an Oldham coupling.

3. The mechanism of claim 1 wherein said means comprises a fixed shaft, an intermediate ring positioned between said fixed shaft and said sun gear, and mating pawls and grooves on said fixed shaft and intermediate ring for rotational connection therebetween and on said intermediate ring and sun gear for rotational connection therebetween.

4. The mechanism of claim 1 wherein said input rotary member has a cylindrical outer surface and the sun gear has a cylindrical inner surface of a slightly larger diameter, and said sun gear is positioned on and loosely supported by the input rotary member.

5. In a speed change pulley drive mechanism for an engine for driving auxiliary equipment through V-belts either directly or at a reduced speed relative to the engine, comprising, a shaft connected to an rotatable with the engine, a pulley case rotatably mounted on said shaft, an epicyclic gear train supported in said pulley case and having a ring gear, multiple planet gears, a carrier rotatably supporting said planet gears and being rotatably supported, and a sun gear, said ring gear mounted on the rotatable with said shaft, said sun gear loosely supported on and rotatable relative to said shaft, clutch means for selectively connecting said ring gear to the pulley case for the direct drive and for selectively connecting said carrier to the pulley case for the reduced speed drive by the epicyclic gear train, a tubular shaft fixed to the engine and encircling said rotating shaft, and means connecting said sun gear to said tubular shaft for limited relative radial movement therebetween and preventing relative rotation.

6. The mechanism of claim 5 wherein said means connecting said sun gear and tubular shaft includes an intermediate ring with interengaging means on said sun gear, intermediate ring and tubular shaft.

7. The mechanism of claim 6 wherein said interengaging means is comprised of grooves in said intermediate ring and pawls on said sun gear and tubular shaft engaging said grooves.

* * * * *